(12) United States Patent  
Lobzakov et al.

(10) Patent No.: US 8,385,815 B2
(45) Date of Patent: Feb. 26, 2013

(54) SYSTEM AND METHOD FOR REDUCING CALL LATENCY IN MONITORED CALLS

(75) Inventors: Yuriy Lobzakov, Walnut Creek, CA (US); Douglas Gisby, Redwood City, CA (US); Carsten Bergmann, Redwood City, CA (US); Robert Joseph James, Leawood, KS (US)

(73) Assignee: Research In Motion Limited, Waterloo, Ontario (CA)

( * ) Notice: Subject to any disclaimer, the term of this patent is extended or adjusted under 35 U.S.C. 154(b) by 968 days.

(21) Appl. No.: 12/394,158

(22) Filed: Feb. 27, 2009

(65) Prior Publication Data

US 2010/0220609 A1 Sep. 2, 2010

(51) Int. Cl.
*H04B 3/36* (2006.01)
(52) U.S. Cl. .......................................................... 455/7
(58) Field of Classification Search ............... 455/7, 18
See application file for complete search history.

(56) References Cited

U.S. PATENT DOCUMENTS

| 6,498,791 | B2* | 12/2002 | Pickett et al. | 370/353 |
| 7,003,079 | B1 | 2/2006 | McCarthy et al. | |
| 7,379,455 | B2* | 5/2008 | Pickett | 370/389 |
| 2001/0005372 | A1* | 6/2001 | Cave et al. | 370/401 |
| 2003/0012196 | A1 | 1/2003 | Ramakrishnan | |

OTHER PUBLICATIONS http://www.envenia.com/callcard.html.
http://www.rhyshaden.com/voice.htm.
http://www.newport-networks.com/whitepapers/qos3.html.
Canadian Intellectual Property Office, Notice of Allowance dated Jun. 19, 2012, in Canadian Patent Application No. 2,691,037.
Matias Erny Reichl Hoffmann, Response to European Search Report dated Dec. 21, 2009, filed in European Patent Application No. 09153999.9.
European Patent Office, Communication under Rule 71(3) EPC, Intent to Grant, issued in European Patent Application No. 09153999.9.

* cited by examiner

*Primary Examiner* — Fan Ng
(74) *Attorney, Agent, or Firm* — Norton Rose Canada LLP

(57) ABSTRACT

A service management platform for processing packet switched communications is provided. The service management platform has a component for handling voice calls. The component for handling voice calls comprises a first input/output for sending and receiving data packets associated with a first leg of a call, a second input/output for sending and receiving data packets associated with a second leg of the call, a monitoring component for monitoring copies of the data packets for commands contained within a payload of the data packets, and a relay component for directly relaying the data packets between the first input/output and the second input/output and for generating and forwarding copies of the data packets to the monitoring component.

18 Claims, 8 Drawing Sheets

SYSTEM AND METHOD FOR REDUCING CALL LATENCY IN MONITORED CALLS

FIELD

The present application relates generally to telecommunications and, more specifically, to a system and method for reducing call latency in monitored calls.

BACKGROUND

The monitoring of telephone calls for commands such as voice commands or DTMF commands in packet switched networks requires that the packets being transmitted be collected in a buffer, decompressed, decoded, processed by the monitoring equipment, encoded, recompressed, and retransmitted in the direction of the receiving equipment. Such multiple compressions/decompressions is referred to as tromboning or hairpinning and increases the latency of voice heard at the receiving end of the call, which results in increased delays when having a voice conversation over such a network.

It would be desirable to monitor telephone calls in a packet switched network in a way that does not suffer from these disadvantages.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In one aspect, the present application provides a service management platform for processing packet switched communications. The service management platform has a component for handling voice calls. The component for handling voice calls comprises a first input/output for sending and receiving data packets associated with a first leg of a call, a second input/output for sending and receiving data packets associated with a second leg of the call, a monitoring component for monitoring copies of the data packets for commands contained within a payload of the data packets, and a relay component for directly relaying the data packets between the first input/output and the second input/output and for generating and forwarding copies of the data packets to the monitoring component.

In another aspect, the present application provides a method for processing commands in a service management platform of a packet switched network. The method comprises receiving data packets from a first leg of a call; sending a first copy of the received data packets directly to a second leg of the call; sending a second copy of the received data packets to a monitoring component for monitoring the data packets for commands contained within the data packets; and detecting commands contained within a payload of the data packets and responding to the detected commands.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

The present application relates to the control and management of communications. Although reference may be made to "calls" in the description of example embodiments below, it will be appreciated that the described systems and methods are applicable to session-based communications in general and not limited to voice calls. It will also be appreciated that the systems and methods may not be limited to sessions and may be applicable to messaging-based communications in some embodiments.

Figure 1:
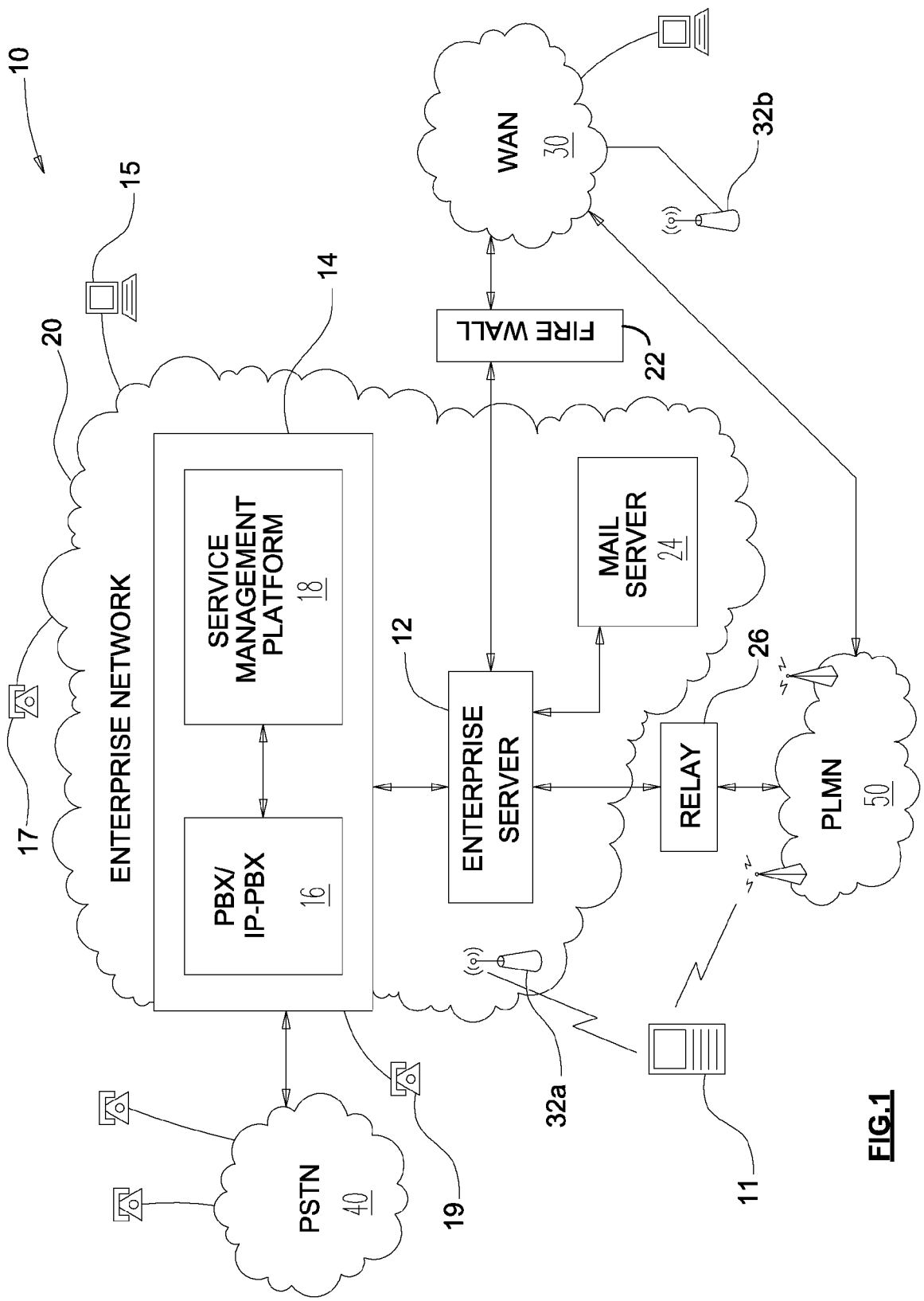
FIG. 1 shows, in block diagram form, an example system for managing enterprise-related mobile calls, including an enterprise communications platform.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch exchange 16 (although in various embodiments the PBX may be a standard PBX or an IP-PBX, for simplicity the description below uses the term PBX to refer to both) having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Further yet, the SMP 18 may have a media processing unit and/or communication enterprise server that may be responsible for call monitoring such as interactive voice response (IVR), which is described in more detail below. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response (IVR), call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
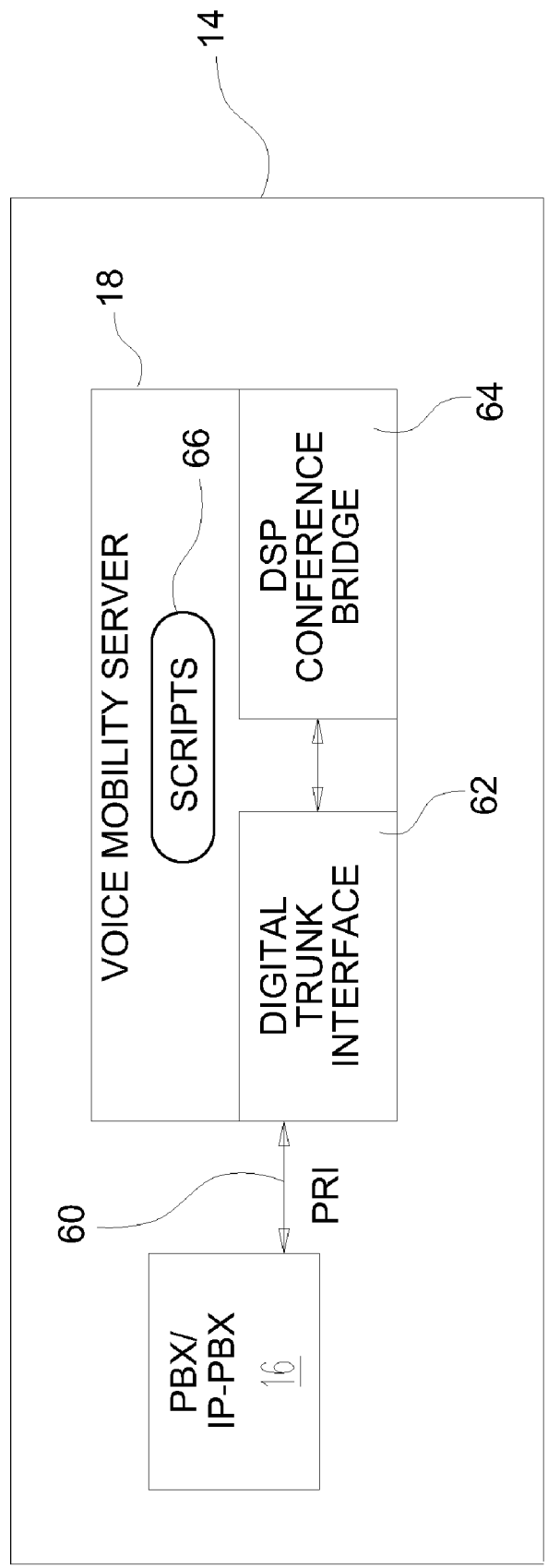
FIG. 2 shows, in block diagram form, further details of an embodiment of the enterprise communications platform.
Figure 3:
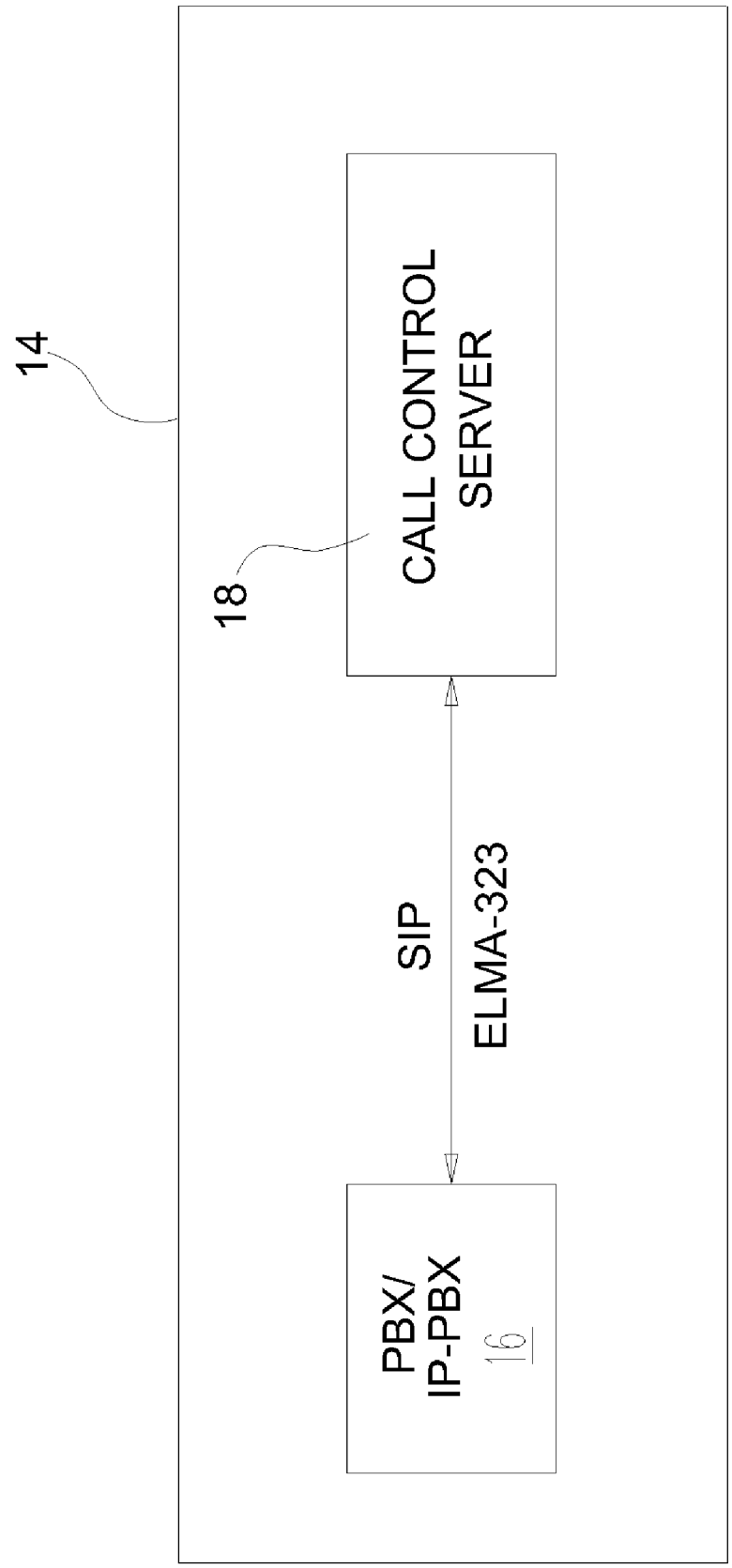
FIG. 3 shows, in block diagram form, another embodiment of the enterprise communications platform.
Figure 4:
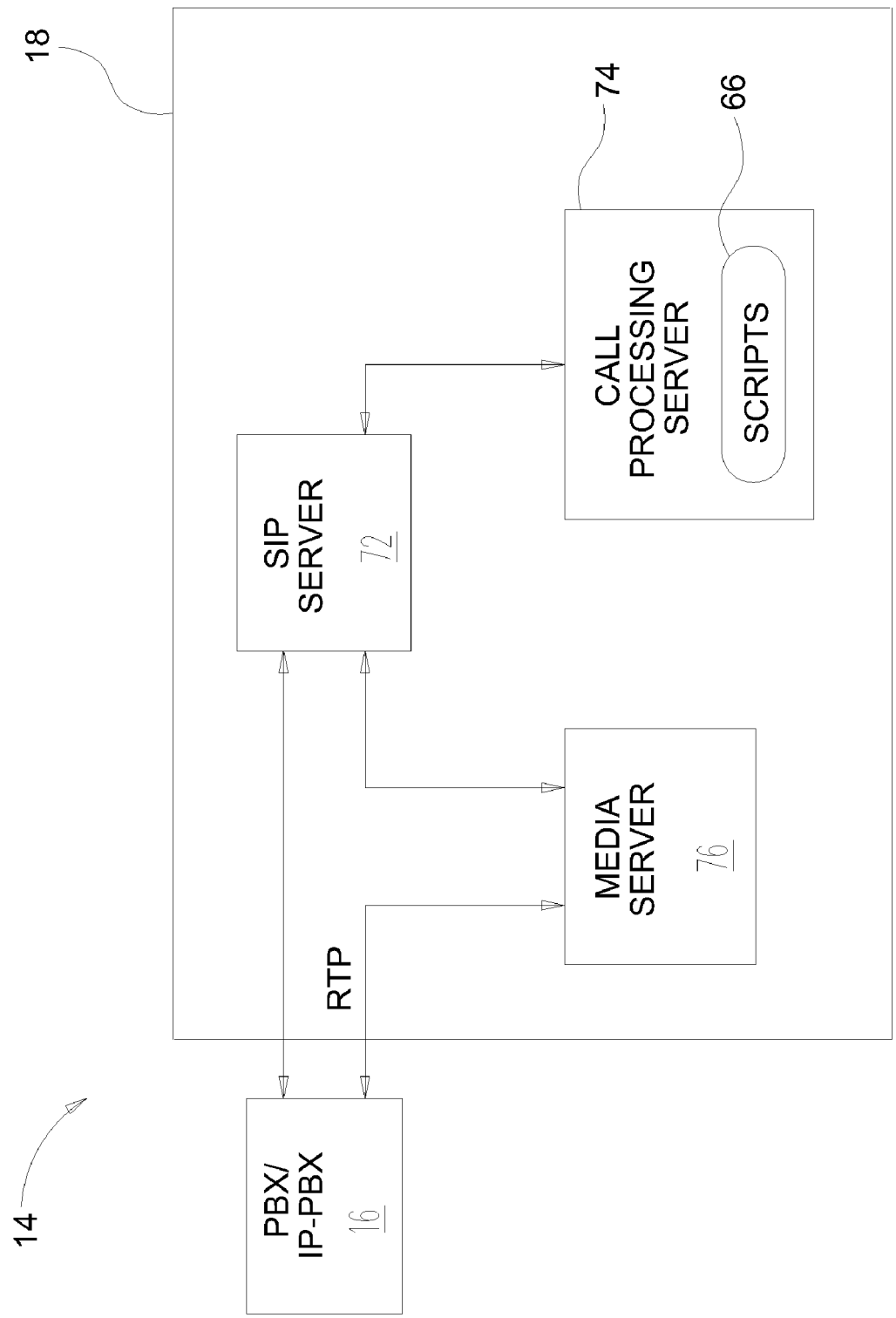
FIG. 4 shows, in block diagram form, yet another embodiment of the enterprise communications platform.

Reference is now made to FIGS. 2 to 4, which show example embodiments of the enterprise communications system 14. Again, although references are made below to "calls" or call-centric features it will be appreciated that the architectures and systems depicted and described are applicable to session-based communications in general and, in some instances, to messaging-based communications.

FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment of the enterprise communications system 14 in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Figure 5A:
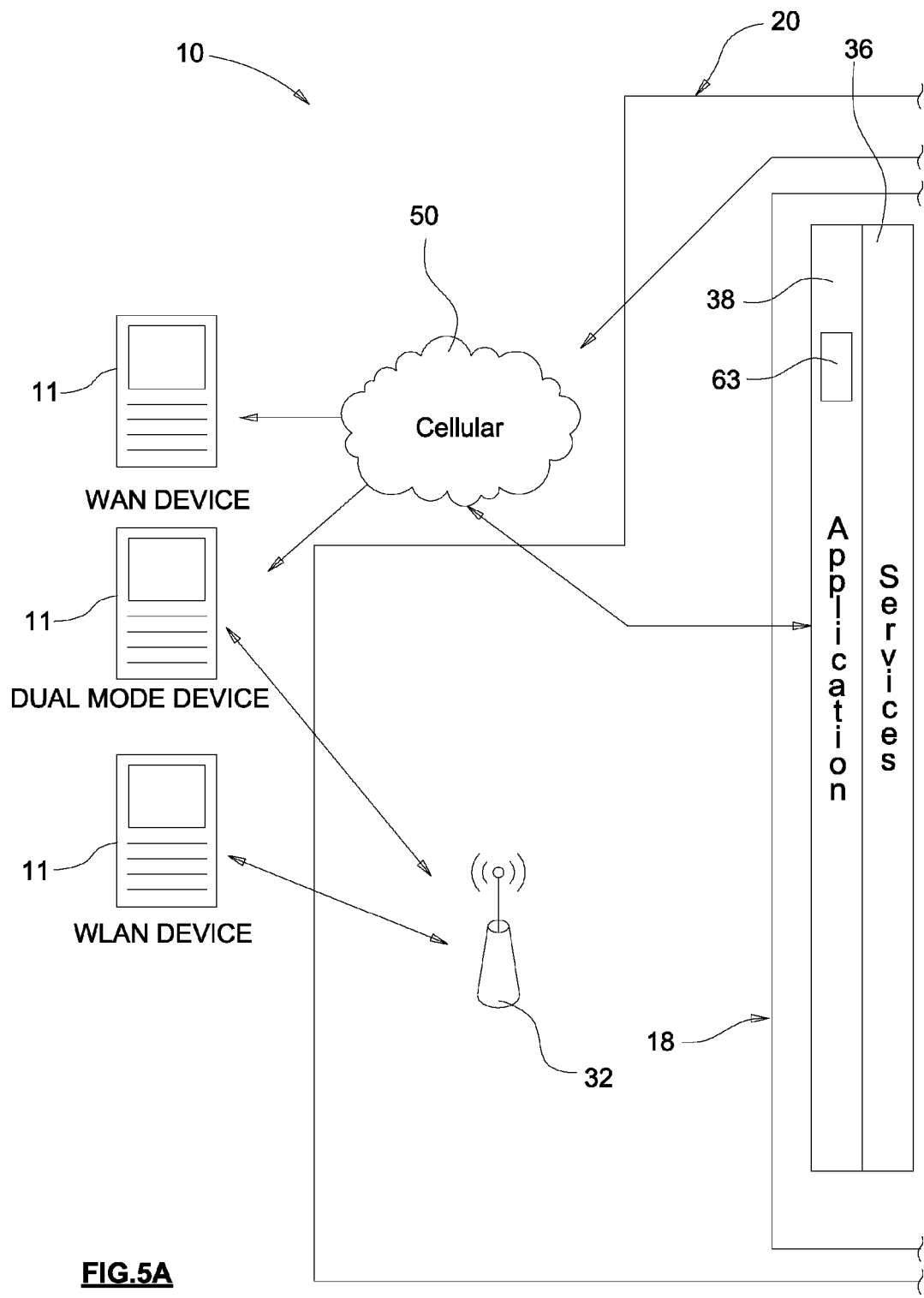
FIGS. 5A and 5B show, in block diagram form, further details of the enterprise communications platform of FIG. 3.
Figure 5B:
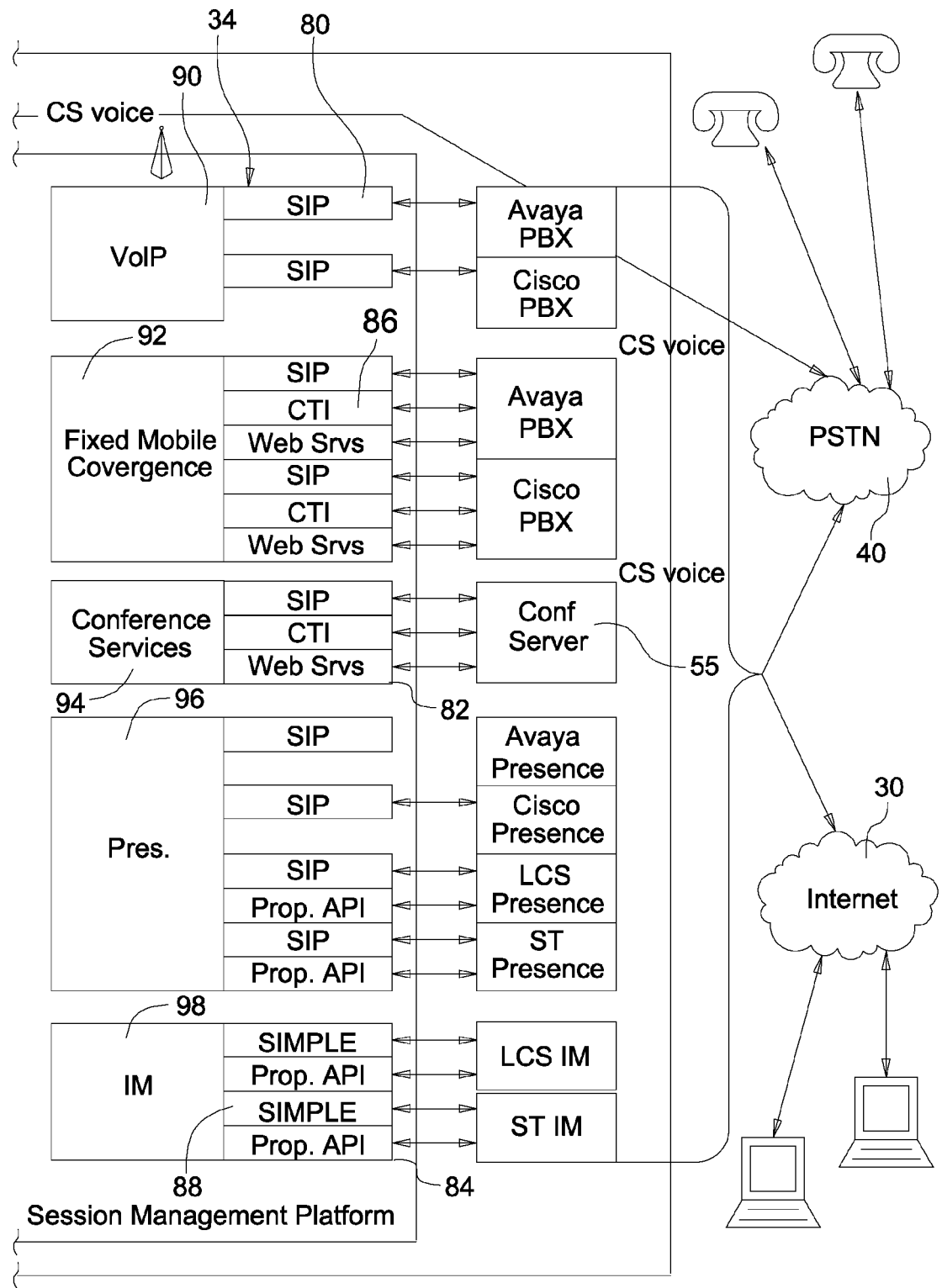

Reference is now made to FIGS. 5A and 5B, collectively referred to as FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 may implement protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

In the embodiment shown in FIG. 5, the SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 may be combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 may be provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Figure 6:
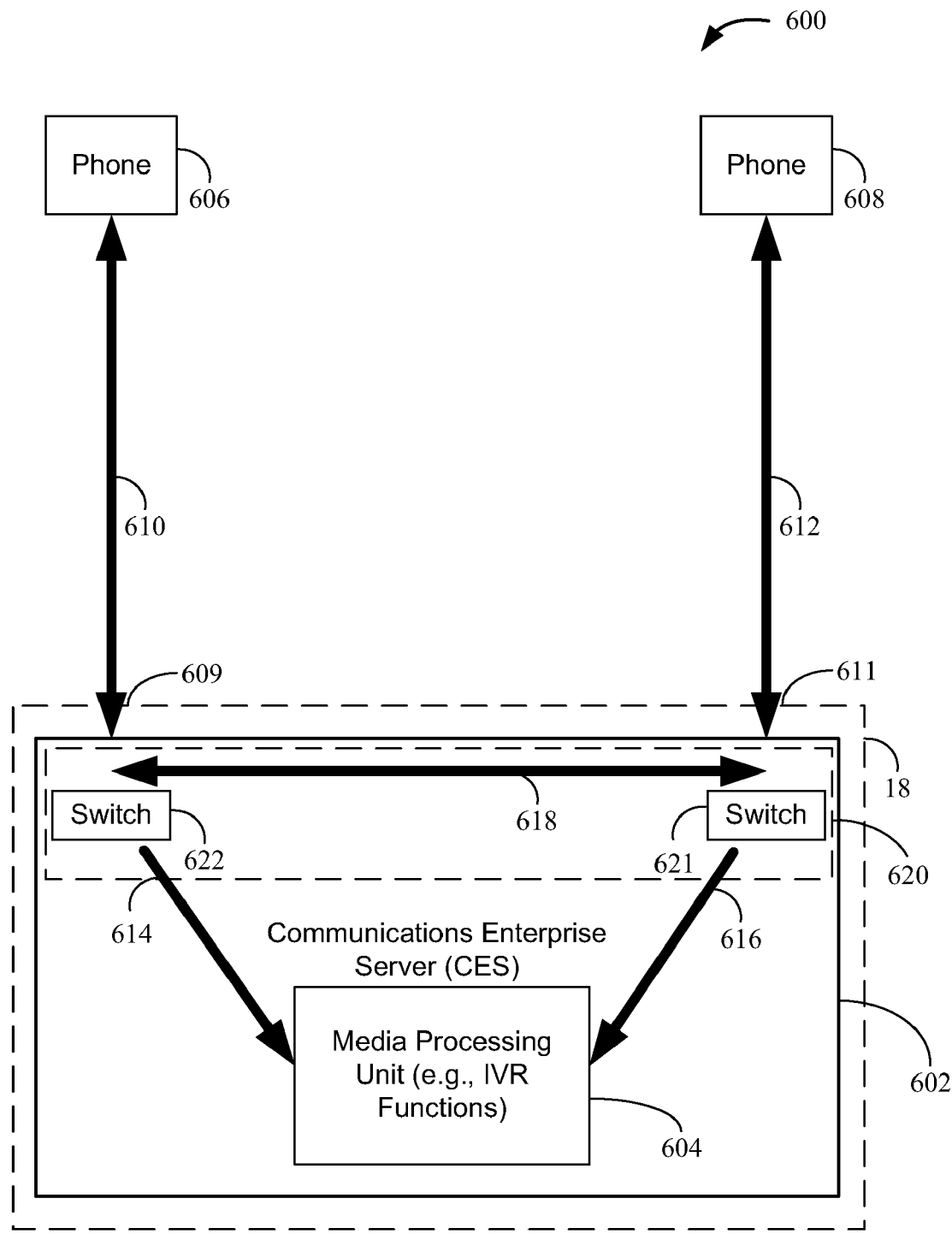
FIG. 6 shows, in block diagram form, further details of the enterprise communications platform designed for reducing call latency in accordance with one embodiment.

Referring now to FIG. 6, a block diagram is shown illustrating details of an embodiment of an enterprise communications platform 14, 600 for reducing call latency in accordance with the disclosure. For the purposes of this example, a simplified enterprise communications platform 600 is shown. While many of the components of the enterprise communications platform 10 are not shown in FIG. 6, it will be understood by those skilled in the art that the components shown in FIGS. 1-5 are suitably employed by the platform 600.

FIG. 6 shows an example of the service management platform 18. The service management platform 18 may have a component for handling voice calls. In one example, the component for handling voice calls may include a communications enterprise server (CES) 602. The CES 602 may have a monitoring component for performing various functions including monitoring data packets for commands. In one example, the monitoring component may include a media processing unit 604. In one example, the CES 602 may be similar to the voice mobility server 18 (FIG. 2) or the call control server 18 (FIG. 3) or the call processing server 74 (FIG. 4), or may be implemented as a module running on any of these servers. While the CES 602 is referred to as a communication enterprise server dealing with exemplary voice calls, the CES 602 may process calls related to any sort of telephone device, including the phones 17 or 19 or the phones connected to the PSTN 40 or the device 11, and may also be responsible for transferring data between any of these devices. The media processing unit 604 may perform various media processing related functions, including monitoring calls passing through the service management platform 18 for commands that are included within the baseband speech conversation, such as interactive voice response (IVR) commands or DTMF tones. These IVR commands or DTMF tones may be provided, for example, by the users of the phones 17 or 19 or the phones connected to the PSTN 40 or by users of the device 11 in order to issue commands to the service management platform 18, such as adding or deleting members to a voice conference, initiating a voice conference, terminating a voice conference, placing a call on hold, taking a call off hold, etc. Two exemplary phones 606 and 608 are shown in FIG. 6 and, in the present example, are currently engaged in a telephone conversation, which may represent any of the phones 17 or 19 or the phones connected to the PSTN 40 or device 11.

Typically, the voice traffic traveling through the platform 600 (or the platform 10) is in the form of packet switched data transmission, such as voice over IP (VOIP), with the exception of the PSTN 40, which is may be largely composed of a circuit switched network. Since the media processing unit 604 monitors for commands found within the voice stream (e.g., 4 khz and below, or within the data packet payload where transmission is in the form of packet switched data transmission), the conventional approach to implement this monitoring includes collecting and decoding the packet switched data transmissions at the communication enterprise server 602 to reconstruct the original voice band signal. For example, bidirectional or full duplex communications take place between phone 606 and service management platform 18, illustrated by arrow 610, and bidirectional or full duplex communications take place between phone 608 and service management platform 18, illustrated by arrow 612. The service management platform 18 may have a first input and/or output 609 for sending and/or receiving data packets associated with a first leg of a call, which may be represented by the arrow 610. The service management platform 18 may further have a second input and/or output 611 for sending and/or receiving data packets associated with a second leg of a call, which may be represented by the arrow 612.

In the conventional approach, link 618 does not exist and is not used. In the collection, decoding, and construction process, components known to those skilled in the art of VOIP are employed, such as a jitter buffer that is used to collect and reassemble the data packets in the appropriate order, before the decoding and/or decompression is performed to reconstruct the original voice signal, which can then be processed for detection of voice commands or DTMF commands at the media processing unit 604. As such, in the conventional approach, arrows 614 and 616 represent bidirectional, full duplex communications. Data communications arriving from phone 608 via link 612 are collected in a jitter buffer of the CES 602, arranged into proper order, decoded and/or decompressed, and provided to the media processing unit 604 for command detection. Thereafter, the data communications are re-encoded and/or compressed and the regenerated data packets are sent along to phone 606 via links 614 and 610.

The same process happens in reverse, where data communications arriving from phone 606 via link 610 are collected in a jitter buffer of the CES 602, arranged into proper order, decoded and/or decompressed, and provided to the media processing unit 604 for command detection. Thereafter, the data communications are re-encoded and/or compressed and the regenerated data packets are sent along to phone 608 via links 616 and 612. Additional decompression and/or decoding and subsequent recompression and/or re-encoding may occur elsewhere in the system 600 along the transmission path of packet switched communications, and this repetitive decompression and/or decoding and subsequent recompression and/or re-encoding is referred to as tromboning or hairpinning. Particularly where jitter buffers are employed, such as in CES 602 and/or the media processing unit 604, this tromboning causes added latency to the voice signal, which is undesirable.

In accordance with one example of the present disclosure, the CES 602 may have a component for directly relaying data packets between the input/output 611 and the input/output 609, generally designated by reference 620. The component 620 may have switches 621 and 622 and a link represented by arrow 618, where the CES 602 employs interactive voice response or DTMF command detection. In one example, the link 618 is a full duplex or bidirectional link and links 614 and 616 are implemented as half duplex or unidirectional links. Switches 621 and 622 may be implemented as real-time transport protocol (RTP) switches that implement RTP proxy by passing the RTP packets to the destination without any analysis of the packets. Alternatively, TDM proxying may also be employed.

According to the present example, data packets arriving from phone 608 via link 612 are directly switched or directed by switch 621 towards switch 622 over link 618. The data communications arriving from phone 608 are also simultaneously directed towards MPU 604 over link 616, which is now implemented as a unidirectional or half duplex link. This process may occur in a number of ways. The switch 621 may be a regenerative switch or repeater that sends one copy of the data packet over link 618 and a second copy of the data packet over link 616, while dispensing with the original data packet. Alternatively, the switch 621 may pass the original data packet on through link 618 and send a copy of the data packet through link 616. The data packets arriving from phone 608 are collected in a jitter buffer of the CES 602, arranged into proper order, decoded and/or decompressed, and provided to the media processing unit 604 as communications for command detection. The MPU 604 may discard the communications after processing the communications for IVR or DTMF commands (e.g., commands that would have been found in the data payload of the data packets) and taking any appropriate action in response to any commands because the same communications were also directly sent to phone 606 using switch 621, link 622, switch 622, and link 610. Using this approach, data packets arriving at the phone 606 from the phone 608 have been monitored by MPU 604 for IVR or DTMF commands but have not been decoded and/or decompressed and recoded and/or recompressed by the CES 602 and/or media processing unit 604 along the journey from the phone 608 to the phone 606, which eliminates any added latency by, for example, the jitter buffer(s) of the CES 602.

The same process may occur in reverse. For example, data communications arriving from phone 606 via link 610 are directly switched or directed by switch 622 towards switch 621 over link 618. Data packets arriving from phone 606 are also simultaneously directed towards MPU 604 over link 614, which is now implemented as a unidirectional or half duplex link. Again, this process may occur in a number of ways. The switch 622 may be a regenerative switch or repeater that sends one copy of the data packet over link 618 and a second copy of the data packet over link 614, while dispensing with the original data packet. Alternatively, the switch 622 may pass the original data packet on through link 618 and send a copy of the data packet through link 614. The data packets arriving from phone 606 are still collected in a jitter buffer of the CES 602, arranged into proper order, decoded and/or decompressed, and provided to the media processing unit 604 as communications for command detection. However, the MPU 604 discards the communications after processing the communications for IVR or DTMF commands and taking any appropriate action in response to any commands because the same communications were also sent directly to phone 608 using switch 622, link 618, switch 621, and link 612. Using this approach, data packets arriving at the phone 608 from the phone 606 have still been monitored by MPU 604 for IVR or DTMF commands but have not been decoded and/or decompressed and recoded and/or recompressed by the CES 602 on the journey from the phone 606 to the phone 608, which eliminates any added latency by, for example, the jitter buffer(s) of the CES 602.

While, in some embodiments, some phone devices such as digital phone 17 or mobile device 11 may provide commands such as conference calling or call control commands over a separate data channel making DTMF or IVR command detection in the baseband voice band signal unnecessary, the system described in connection with FIG. 6 is particularly beneficial when, for example, data channels are unavailable to the device 11 and/or the digital phone 17, or when an analog phone such as the phone 19 or phones connected to the PSTN 40 are involved in a call or conference.

In some embodiments the switches 621 and 622 and the link 618 may be implemented as physical switches and links in a network. In one alternative, the switches 622 and 621 may be replaced by a single switch in the link 618 that sends one copy of all traffic traversing the bidirectional link 618 to the MPU 604. In other embodiments, the service management platform 18 and, consequently, the switches 621 and 622 and the link 618 are implemented using programmed instructions, where the CES 602 and/or the MPU 604 may be implemented as a server or servers in the networks 10 or 600. The programmed instructions may be embodied in the one or more software modules resident in a memory of the server. Alternatively, the programmed instructions may be tangibly embodied on a computer readable medium (such as a DVD, CD, floppy disk or other storage media) which may be used for transporting the programmed instructions to the memory the server. Alternatively, the programmed instructions may be embedded in a computer-readable, signal-bearing medium that is uploaded to a server of the network by a vendor or supplier of the programmed instructions, and this signal-bearing medium may be downloaded through one or more of the interfaces of the server through a network.

In the description above, the term link is intended to include a physical electrical cable, a fiber optic connection, a wireless connection, or any other suitable connection for conveying an optical, electronic, or electromagnetic signal. As is understood by those skilled in the art, the terms half duplex and unidirectional refer to a signal that is being sent in one direction with no corresponding return signal and the terms full duplex and bidirectional refer to a corresponding signals being sent in both directions.

Figure 7:
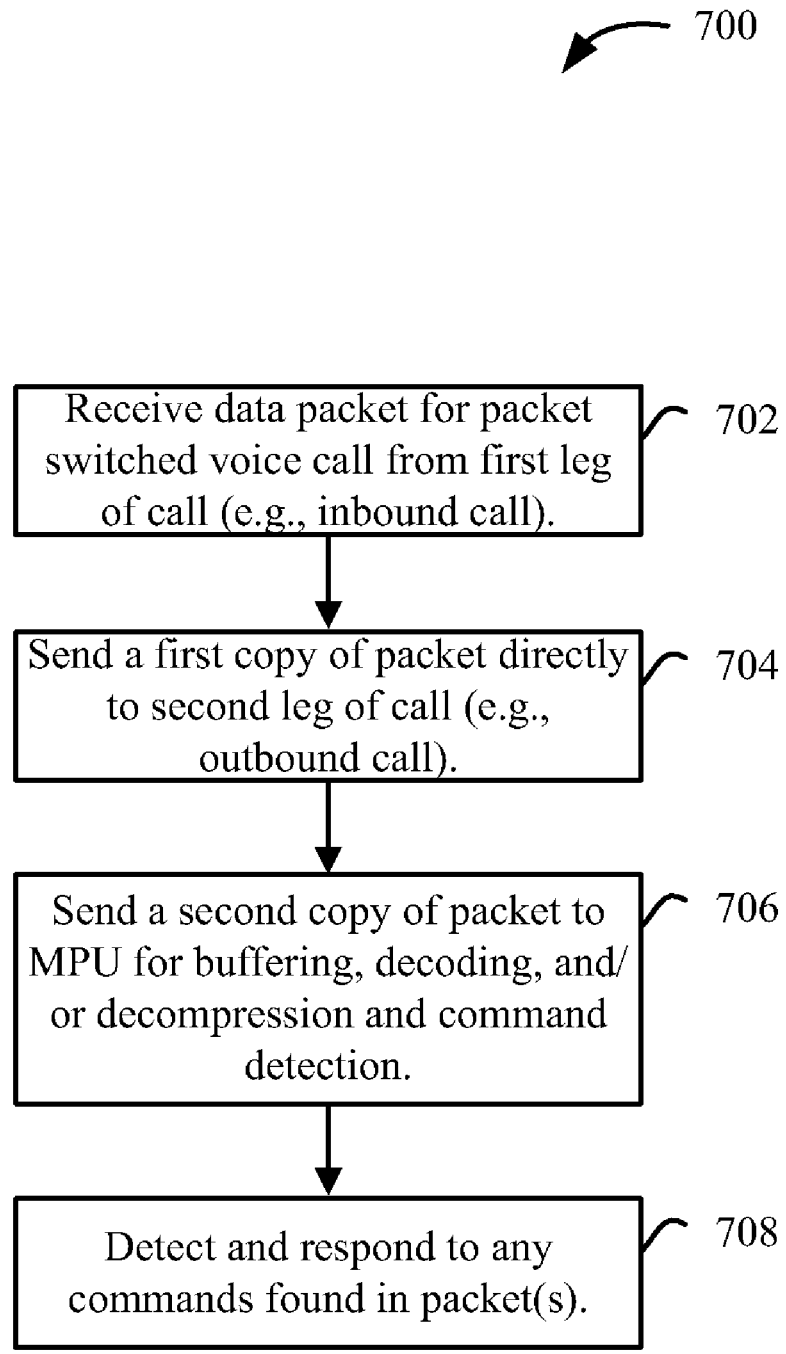
FIG. 7 shows in flowchart form a method of reducing call latency in an enterprise communications platform in accordance with one embodiment.

Referring to FIG. 7, a method 700 is shown in flowchart form for reducing call latency in an enterprise communications platform in accordance with one embodiment. The method 700 may also be referred to as a method for processing commands in an enterprise communications platform. The method 700 is, in one example, implemented by the Communication Enterprise Server 602 shown in FIG. 6.

At a first block 702, a data packet is received for a packet switched voice call from a first leg of a call, which may also be referred to as an inbound call. For example, a data packet may be received by the CES 602 from the phone 608 over the link 612.

At a second block 704, a first copy of the data packet is sent directly to a second leg of the call, which may be referred to as the outbound call. For example, a first copy of the data packet may be directed by switch 621 to switch 622 over link 618, which then directs the packet to phone 606 over connection 610, where connection 610 comprises at least a part of the second leg of the call. In one example, this may be accomplished using a real-time transport protocol (RTP) proxy by passing the packets (e.g., RTP packets) to the destination without any analysis of the packets. Alternatively, TDM proxying may also be employed.

At a third block 706, a second copy of the packet is passed to a monitoring component for monitoring the data packets for commands, for example to the MPU 604, for buffering, decoding, and/or decompression and command detection of any IVR or DTMF commands that may be found in baseband voice signal. Alternatively, any portion of the buffering, decoding, and/or decompression may be performed by the CES 602 and the remaining processing and/or detection may be performed by the MPU 604. It will be understood that, depending on the particular configuration chosen according to the needs of a particular application, one of the first copy and second copy may be the original received data packet and only one copy of each data packet may be generated.

At a fourth block 708, the MPU detects any commands found in the payload of the packet(s) and responds accordingly. Response may be coordinated with the aid of the CES 602 and/or the service management platform 18, depending on the particular response needed based on the detected command. For example, a command may be detected to add an additional caller to a conference call in progress, which may involve several components of the system 10 working together. Other examples include detecting a command to delete a member from a voice conference and deleting the member from the voice conference, detecting a command to initiate a voice conference and initiating the voice conference, detecting a command to terminate a voice conference and terminating the voice conference, detecting a command to place a call on hold and placing the call on hold, and detecting a command to take a call off hold and taking the call off hold.

While the method 700 has been described with reference to an inbound call and an outbound call, the same method 700 is typically operative in a complementary fashion for data packets arriving from the outbound call and destined for the inbound call.

Certain adaptations and modifications of the described embodiments can be made. Therefore, the above discussed embodiments are considered to be illustrative and not restrictive.

What is claimed is:

1. A service management platform for processing packet switched communications, the service management platform having a component for handling voice calls comprising:
    a first input/output for sending and receiving data packets associated with a first leg of a call;
    a second input/output for sending and receiving data packets associated with a second leg of the call;
    a monitoring component for monitoring copies of the data packets for commands for implementing service management platform functions contained within a payload of the data packets;
    a relay component for directly relaying the data packets between the first input/output and the second input/output and for generating and forwarding the copies of the data packets to the monitoring component;
    at least one jitter buffer for buffering and ordering received data packets in proper order; and
    at least one decompression and decoding component for receiving the ordered data packets and decompressing and decoding the data packets into a baseband voice signal for processing by the monitoring component.

2. The service management platform of claim 1, wherein the monitoring component comprises a media processing unit that monitors for the commands selected from the group consisting of interactive voice response (IVR) commands and dual-tone multi-frequency (DTMF) commands.

3. The service management platform of claim 1, wherein the direct relaying of data packets between the first input/output and the second input/output is performed using one of a real time protocol (RTP) proxy and time division multiplexed (TDM) proxy.

4. The service management platform of claim 1, wherein the first leg of the call and the second leg of the call comprise full duplex channels, the direct relay of the data packets between the first input/output and the second input/output comprises a full duplex channel, and the forwarding of copies of the data packets to the monitoring component uses at least one half duplex channel.

5. The service management platform of claim 1, wherein the component for handling voice calls comprises a communication enterprise server.

6. The service management platform according to claim 1, wherein the monitoring component receives the baseband voice signal from the component for handling voice calls and processes the baseband voice signal to detect commands selected from the group consisting of interactive voice response (IVR) commands and dual-tone multi-frequency (DTMF) commands.

7. The service management platform according to claim 1, wherein the monitoring component is configured to process the baseband voice signal to detect commands selected from the group consisting of interactive voice response (IVR) commands and dual-tone multi-frequency (DTMF) commands.

8. A method for processing commands in a service management platform of a packet switched network, the method comprising:
    receiving data packets from a first leg of a call;
    sending a first copy of the received data packets directly to a second leg of the call;
    ordering the received data packets in proper order;
    decompressing and decoding the ordered data packets into a baseband voice signal for processing by a monitoring component;
    sending a second copy of the received data packets to the monitoring component for monitoring the data packets for commands contained within the data packets; and
    detecting commands contained within a payload of the data packets and responding to the detected commands.

9. The method according to claim 8, wherein ordering the received data packets in proper order; and decompressing and decoding the ordered data packets into a baseband voice signal for processing is carried out at the monitoring component.

10. The method of claim 9, wherein the ordering is performed using a jitter buffer.

11. The method of claim 9, wherein the ordering is performed using a jitter buffer.

12. The method of claim 9, wherein the monitoring component comprises a media processing unit that monitors for commands selected from the group consisting of interactive voice response (IVR) commands and dual-tone multi-frequency (DTMF) commands.

13. The method of claim 9, wherein the sending a first copy of the received data packets directly to the second leg of the call is performed using one of a real time protocol (RTP) proxy and time division multiplexed (TDM) proxy.

14. The method of claim 9, wherein the first leg of the call and the second leg of the call comprise full duplex channels, the first copy is sent using a full duplex channel, and the second copy is sent using a half duplex channel.

15. The method of claim 9, wherein the service management platform comprises a communication enterprise server that primarily performs the method.

16. A method for processing commands in a service management platform of a packet switched network, the method comprising:
receiving data packets from a first leg of a call;
sending a first copy of the received data packets directly to a second leg of the call;
sending a second copy of the received data packets to a monitoring component for monitoring the data packets for commands contained within the data packets; and
detecting commands contained within a payload of the data packets and responding to the detected commands by at least one of: detecting a command to add a member to a voice conference and adding the member to the voice conference, detecting a command to delete a member from a voice conference and deleting the member from the voice conference, detecting a command to initiate a voice conference and initiating the voice conference, detecting a command to terminate a voice conference and terminating the voice conference, detecting a command to place a call on hold and placing the call on hold, and detecting a command to take a call off hold and taking the call off hold.

17. A method for processing commands in a service management platform of a packet switched network, the method comprising:
receiving data packets from a first leg of a call;
sending a first copy of the received data packets directly to a second leg of the call;
sending a second copy of the received data packets to a monitoring component for monitoring the data packets for commands contained within the data packets; and
detecting commands contained within a payload of the data packets and responding to the detected commands;
wherein data packets are receivable from the second leg of the call with the first copy being sent to the first leg of the call and the second copy being sent to the monitoring component such that the call operates in a bidirectional manner.

18. A method for processing commands in a service management platform of a packet switched network, the method comprising:
receiving data packets from a first leg of a call;
sending a first copy of the received data packets directly to a second leg of the call;
sending a second copy of the received data packets to a monitoring component for monitoring the data packets for commands contained within the data packets; and
detecting commands contained within a payload of the data packets and responding to the detected commands;
wherein the first copy of the received data packets comprises the original received data packets being directly sent to the second leg of the call.

* * * * *

UNITED STATES PATENT AND TRADEMARK OFFICE
CERTIFICATE OF CORRECTION

PATENT NO. : 8,385,815 B2  
APPLICATION NO. : 12/394158  
DATED : February 26, 2013  
INVENTOR(S) : Lobzakov et al.

Page 1 of 1

It is certified that error appears in the above-identified patent and that said Letters Patent is hereby corrected as shown below:

In the Claims:

Claim 11, first line, "The method of claim 9" should be replaced with --The method of claim 8--.

Claim 12, first line, "The method of claim 9" should be replaced with --The method of claim 8--.

Claim 13, first line, "The method of claim 9" should be replaced with --The method of claim 8--.

Claim 14, first line, "The method of claim 9" should be replaced with --The method of claim 8--.

Claim 15, first line, "The method of claim 9" should be replaced with --The method of claim 8--.

Signed and Sealed this  
Sixth Day of August, 2013

Teresa Stanek Rea  
*Acting Director of the United States Patent and Trademark Office*

UNITED STATES PATENT AND TRADEMARK OFFICE
CERTIFICATE OF CORRECTION

PATENT NO. : 8,385,815 B2  
APPLICATION NO. : 12/394158  
DATED : February 26, 2013  
INVENTOR(S) : Lobzakov et al.

Page 1 of 1

It is certified that error appears in the above-identified patent and that said Letters Patent is hereby corrected as shown below:

In the Claims:

Column 12 line 50 (Claim 11, line 1) "The method of claim 9" should be replaced with --The method of claim 8--.

Column 12, line 52 (Claim 12, line 1) "The method of claim 9" should be replaced with --The method of claim 8--.

Column 12, line 57 (Claim 13, line 1) "The method of claim 9" should be replaced with --The method of claim 8--.

Column 12, line 61 (Claim 14, line 1) "The method of claim 9" should be replaced with --The method of claim 8--.

Column 12, line 65 (Claim 15, line 1) "The method of claim 9" should be replaced with --The method of claim 8--.

This certificate supersedes the Certificate of Correction issued August 6, 2013.

Signed and Sealed this  
Twenty-seventh Day of August, 2013

Teresa Stanek Rea  
*Acting Director of the United States Patent and Trademark Office*